Patented Sept. 5, 1950

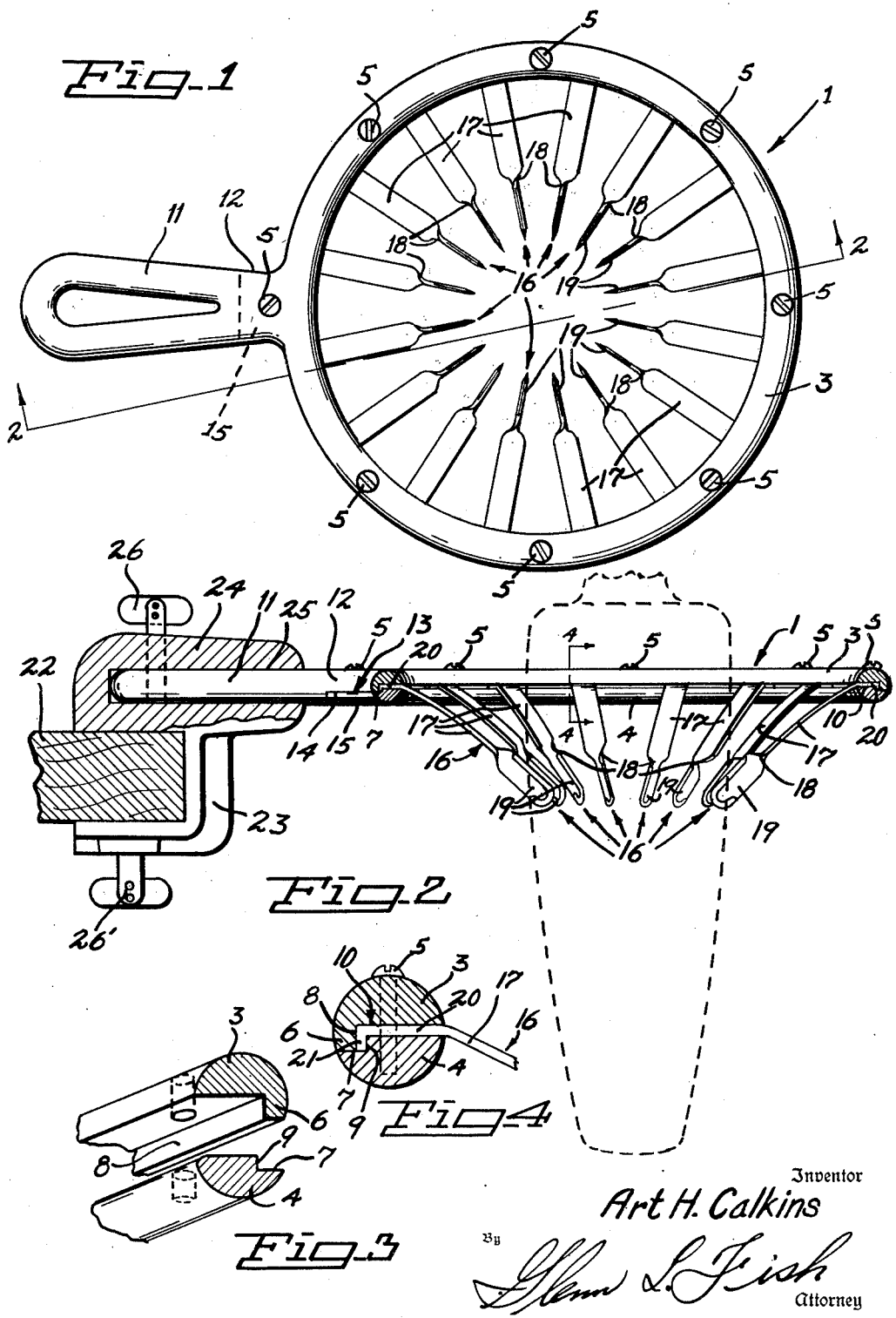

2,521,115

UNITED STATES PATENT OFFICE 2,521,115

CORN SHREDDER HAVING STATIONARY BLADES

Art H. Calkins, Spokane, Wash.

Application January 13, 1949, Serial No. 70,729

1 Claim. (Cl. 146—4)

My present invention relates to a device for preparing food for human consumption and more particularly to a corn shredder having stationary blades of the type used for shredding edible corn on the cob, it being one object of the invention to provide a device of such construction that when the corn on the cob is passed therethrough, resilient sharpened blades slice the husks of the kernels, freeing the core of said kernels to enable one to freely eat the cores without removing the kernel husks from the cob.

Another object of the invention is to provide a corn shredder wherein the frame is constructed to receive multiple resilient blades which depress permitting various sizes of ears of corn to pass through while cutting the kernels.

Another object of the invention is to form the blades with a head to be secured in a circular frame with the sharpened ends extending toward a common point at the center of the frame which will cause the blades to be radially disposed within the frame.

Another object of the invention is to provide a shredder simple in construction and inexpensive to manufacture.

The invention is illustrated in the accompanying drawings wherein:

Fig. 1 is a plan view of the invention showing the blades disposed radially within the frame.

Fig. 2 is a view in cross section taken on line 2—2 of Fig. 1.

Fig. 3 is a view in perspective showing a fragmentary portion of the frame.

Fig. 4 is a cross section upon an enlarged scale taken as at line 4—4 of Fig. 2.

My improved corn shredder constituting the subject matter of this invention is used for shredding or slicing the kernels of corn which are secured to the cob and generally known as an ear of sweet corn. Each kernel has a tough skin and in order to make the corn more palatable, the ears are cooked and then forced through the shredder as many times as desired until the corn is adequately shredded for ease in eating.

The corn shredder is provided with a frame indicated in general by the numeral 1 which is formed of upper and lower rings 3 and 4 secured together by screws 5 rotatably passing through upper ring 3 and threadedly engaging lower ring 4. I have provided on the bottom face of ring 3 a depending concentric shoulder 6 which is adapted to rest in a concentric recess 7 on the top face of lower ring 4. Recess 7 is of greater width than shoulder 6 thus the side face 8 of shoulder 6 is disposed in spaced relation to side face 9 of ring 4. Shoulder 6 is of greater length than the depth of recess 7, thus the opposing faces of rings 3 and 4 will be in spaced relation to each other, providing a circumferential slot 10 which is substantially L-shape in cross section.

Upper ring 3 is provided with an integral handle 11 having a neck 12 diminished in thickness at 13 forming a recess 14 to receive an ear 15 integrally formed with ring 4. A screw 5 rotatably passes through the reduced neck 12 and is threaded into the ear 15 thus materially adding to the strength of the handle and rigidly securing rings 3 and 4 together.

The frame 1 is supplied with multiple blades 16 formed of resilient flat spring steel having a shank 17 twisted about its longitudinal axis at 18 to dispose a cutting blade 19 in the vertical plane. The cutting blade is sharpened on its lower end face and its upper edge to provide a sharpened edge for cutting corn kernels on various sizes of cobs.

The shank 17 is provided with a head 20 disposed at an angle to the shank and the head carries a lip 21 depending at right angles to the head. The head 20 and lip 21 coact with slot 10 to secure the blades in spaced relation radially about the circular frame with the sharpened blades disposed at a downward incline toward the center of the frame. Screws 5 are then tightened thus clamping the heads 20 between the rings 3 and 4.

By providing the blades with resilient shanks 17 it allows the blades to cut the kernels along the full length of the cob or ear of corn by conforming to the shape of the ear. When a large ear of corn is passed through the shredder, the blades bend allowing various sizes of ears to pass through.

As shown in Fig. 2 I have secured the invention to a table 22 by means of a clamp 23 secured thereto by a thumb screw 26'. The upper portion of the clamp is provided with a head 24 slotted at 25 to receive the handle 11 which is then secured by a thumb screw 26. By thus securing the invention it enables the operator to use both hands while passing the ears of corn through the shredder.

Having thus described the invention what I claim as new and desire to secure by Letters Patent is:

A corn shredder comprising a circular frame having upper and lower circular sections having inner faces disposed in confronting relation to each other, the said confronting faces each having flat inner and outer circumferentially extending portions in offset relation to each other and a circumferentially extending shoulder between its offset inner and outer portions, the said offset portions of each and the shoulder of each section being in confronting face to face relation to the corresponding offset portions and shoulder of the other section, blades spaced from each other circumferentially of said frame extending towards the center of space enclosed by the frame and having shanks fitting between the confronting inner offset portions of the confronting inner faces of the said sections and terminating in downwardly projecting lugs fitting between the confronting shoulders of the sections, and removable fasteners holding said sections together and in gripping engagement with the shanks and the lugs of the blades.

ART H. CALKINS.

REFERENCES CITED

The following references are of record in the file of this patent:

UNITED STATES PATENTS

| Number | Name | Date |
|---|---|---|
| 2,383,814 | Richardson | Aug. 28, 1945 |
| 2,412,149 | Higgins | Dec. 3, 1946 |
| 2,458,090 | Miller | Jan. 4, 1949 |

FOREIGN PATENTS

| Number | Country | Date |
|---|---|---|
| 291,600 | Germany | May 1, 1916 |
| 299,067 | Italy | July 21, 1932 |